Patented Oct. 4, 1938

2,131,865

UNITED STATES PATENT OFFICE 2,131,865

PROCESS OF MAKING PENTAMETHINE CYANINE DYES

Walter Zeh, Dessau in Anhalt, Germany, assignor to Agfa Ansco Corporation, Binghamton, N. Y., a corporation of New York No Drawing. Application May 28, 1934, Serial No. 728,043. In Germany June 3, 1933

6 Claims. (Cl. 260—240)

My present invention relates to dyes of the polymethine series.

One of its objects is to provide a process of producing dyes from the polymethine series. Another object are the dyes of the polymethine series which have proved to be valuable sensitizers. Further objects will be seen from the detailed specification following hereafter.

The symmetrical pentamethinecyanines have already been proposed as sensitizers for the range of wave lengths between 650μμ and 1000μμ.

According to this invention I have found, that the unsymmetrical pentamethinecyanines are well suited for sensitizing a silver halide emulsion for this range of wave lengths. The progress involved by the new sensitizers resides not only in the fact that an extraordinary great number of suitable dyes is now available, but also in the fact, that by suitably combining different quaternary ammonium salts of heterocyclic nitrogenous bases containing a methyl group capable of reaction nearly any desired maximum of sensitization may be obtained in the infra-red portion of the spectrum. Thus it is possible to adjust the sensitivity of the emulsion according to requirement.

For the preparation of the unsymmetrical pentamethinecyanines there is first made an intermediate product by condensing in the presence of an alkaline condensing agent equivalent portions of a quaternary ammonium salt of a heterocyclic base containing a methyl group capable of reaction and of a propene compound of the general formula:

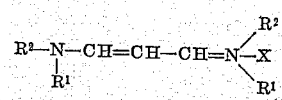

where $R^1$ stands for alkyl or hydrogen, $R^2$ for aryl and X for an acid radical.

As alkaline condensing agent I have found suitable, for instance, primary, secondary and tertiary amines, such as methylamine, diethylamine, trimethylamine, triethylamine, piperidine, pyridine, or sodium ethylate, or ethanolamines. The amount of condensing agent used is preferably a quantity at most equivalent to that of the base which is used, because an increasing amount of condensing agent promotes the formation of symmetrical dye from which the intermediate product must be separated, usually by physical means (crystallization, decocting). The most suitable amount to be used of each condensing agent can easily be determined by experiment. Condensing agents which may casually be applied in excess so that nevertheless the formation of intermediate product occurs are the amines. In case of using pyridine or condensing agents of similar action which simultaneously are used as solvents, there may be used an excess for obvious reasons. It is advisable to use an amount of the propene compound substantially exceeding the quantity equivalent to that of the base; preferably there is used a more than 10 per cent excess in order to avoid as far as possible the undesired formation of symmetrical dye.

If as heterocyclic base there is used, for example, benzthiazole, the reaction of the 2-methylbenzthiazole alkyl iodide with α-phenylamido-γ-phenylimidopropene hydrochloride in the presence of piperidine to form a tetramethine dye probably proceeds according to the following scheme:

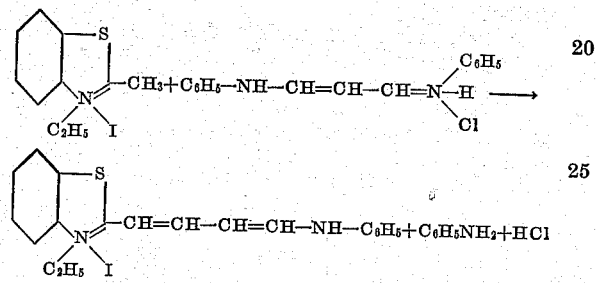

For the production of the pentamethinecyanine dye, the tetramethine dye formed as intermediate product is caused to react in the presence of an alkaline condensing agent with a quaternary ammonium salt of another heterocyclic base containing a reactive methyl group. The reaction probably proceeds according to the following scheme:

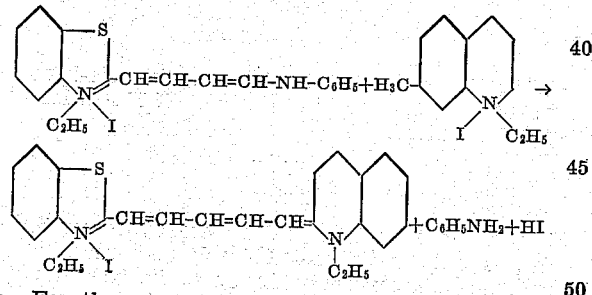

For the condensation with the propene compound and with the tetramethine dye there are suitable all heterocyclic bases which contain a reactive methyl group, for example, mono- and poly-nuclear 2-methylthiazoles, 2-methyl-selenazoles, and 2- or 4-methyl-quinolines. As alkaline condensing agents there may be mentioned, for example, pyridine, piperidine, ethanolamine, alkyl-amines and sodium ethylate.

By use of suitable of heterocyclic bases, there are obtained in accordance with the invention pentamethinecyanine dyes of the general formula:

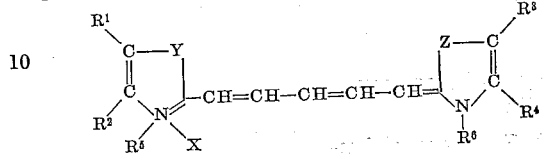

In this formula

Y and Z=S, Se, —CH=CH—

$R^1$, $R^2$, $R^3$, $R^4$=hydrogen, alkyl

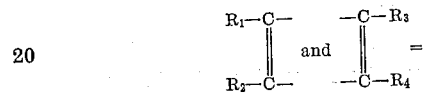

unsubstituted or substituted phenylene, naphthylene or other polynuclear arylene groups; suitable substituents are alkyl, aryl, alkoxy, carbethoxy, thioalkyl, seleno-alkyl, substituted and unsubstituted amino-groups.

A necessary condition is that either Y and Z or $R^1$, $R^2$ and $R^3$, $R^4$ shall differ from one another.

$R^5$ and $R^6$=alkyl,

X=an inorganic or organic acid radical, for example Cl, Br, I, $ClO_4$, $CH_3—C_6H_4—SO_3$, $CH_3—SO_4$, $C_2H_5—SO_4$.

The quinoline nucleus which results in case of Y being —CH=CH— may be linked to the polymethenyl chain in 2 or 4 position. Individual hydrogen atoms of the pentamethine chain can be replaced by alkyl groups, for example by methyl or ethyl.

In the general formula Y and Z may represent sulfur, selenium or the vinyl group CH=CH. In the case of dyes in which, for instance, a thiazole nucleus and a selenazole nucleus are linked together by a pentamethenyl chain $R^1$, $R^2$, $R^3$ and $R^4$ may represent hydrogen, or they may represent alkyl, or aryl or carbethoxy.

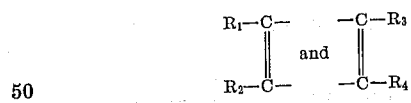

may represent phenylene, or naphthylene or a polynuclear arylene group, for instance, the corresponding radical of anthracene, chrysene, fluorene or acetnaphthene. In the case of Y being sulfur, Z being selenium,

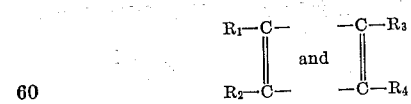

being phenylene, the dye is a benzthiazole-benzselenazole-pentamethinecyanine. If Y is selenium, Z is sulfur,

is phenylene, and $R_3$ and $R_4$ are hydrogen the dye is a benzselenazole-thiazole-pentamethinecyanine. This not only illustrates the dyes which are contemplated by the invention but also the nomenclature. In the case of Y being CH=CH, Z being sulfur and $R^1$, $R^2$, $R^3$, $R^4$ being hydrogen, there result dyes in which a pyridine nucleus is linked together with a thiazole nucleus by a pentamethenyl chain. If Y is CH=CH, Z is sulfur,

is phenylene, $R^3$ and $R^4$ are hydrogen, there results a dye in which a quinoline nucleus is linked together with a thiazole nucleus by a pentamethenyl chain and is called a quinoline-thiazole-pentamethinecyanine. The quinoline nucleus may be linked in 2 or 4 position. The benzene rings or polynuclear rings fused on the heterocyclic rings containing a nitrogen atom may be substituted for instance by alkyl, alkoxy, aryl, halogen, substituted or unsubstituted amino groups. The radicals $R^5$ and $R^6$ linked to the nitrogen atoms of the heterocyclic rings linked together by the pentamethenyl chain represent alkyl. X represents an anion, for instance those disclosed above.

The dyes are obtainable according to the desired solubility in form of the bromide, iodide, perchlorate etc. and are used in a quantity such as is usual for the known sensitizing dyes. This quantity may amount to about 0.5 to 2 milligrams per 1 kg. of emulsion ready for being cast which contains about 9 per cent of gelatin, 4.5 per cent of silver halide and the rest water. However, I do not wish to limit my invention to the quantities just indicated, the most suitable amount will in each case be found by a few comparative experiments. The dyes may be added to the emulsion in form of solutions. Suitable solvents are the alcohols, for instance, methyl or ethyl alcohol which may be used anhydrous or diluted with water. The dyes are applied to the emulsion during any stage of its production, however, they are preferably added to the finished emulsion before casting.

The dyes may likewise be added to the emulsion by bathing the finished photographic material in a bath in which the dye is dissolved. Such a treatment may be as follows: The photographic material to be sensitized is bathed in a solution containing 1 milligram of [3-ethyl-5-methoxy-benzselenazole-(2)] - [3-ethyl-6-methyl-quinoline-(2)]-pentamethinecyanine iodide in 500 to 1000 cc. of an aqueous solution of methanol of 50 per cent strength for about 5 minutes. The material is then dried, whereupon it is ready for use.

The following examples illustrate the invention.

*Example 1.*—2 grams of 2-methylbenzthiazole ethiodide, 2 grams of α-phenylamido-γ-phenylimidopropene hydrochloride (prepared according to Claisen, Berichte der deutschen chemischen Gesellschaft, vol. 36, page 3667) and 10 cc. of alcohol are heated to boiling, 0.5 cc. of piperidine are added and the whole is boiled for about a further half hour. On cooling, there separates the tetramethine dye (intermediate product) of the following probable constitution:

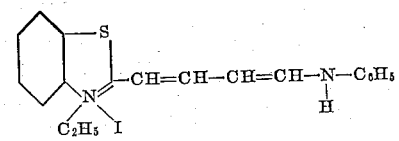

The dye is recrystallized from alcohol.

In alcoholic solution, the dye has an absorption maximum at 515μμ.

1 gram of the intermediate product so obtained, 1 gram of 2:5:5-trimethylbenzselenazole ethiodide and 5 cc. of alcohol are heated to boiling and there is then added gradually about 1 cc. of diethylamine, boiling being continued until the reaction mixture has become deep blue. On cooling, [3-ethyl-benzthiazole-(2)]-[3-ethyl-5.6-dimethyl - benzselenazole-(2)] - pentamethinecyanine iodide of the probable formula:

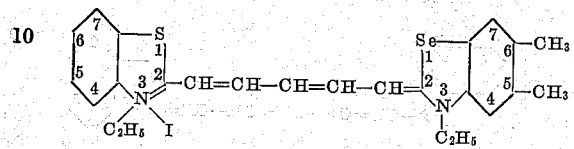

separates in the form of coarse green crystals.

The alcoholic solution of the dye has an absorption maximum at a wave length of about 670μμ.

Incorporated in a silver bromide emulsion containing about 4 per cent of silver iodide the dye imparts to it a range of sensitivity from about 600μμ to 800μμ with a maximum of about 715μμ.

*Example 2.*—2 grams of 2-methyl-5:6-dimethoxy-benzthiazole ethiodide and 2 grams of α-phenylamido-γ-phenylimido-propene hydrochloride are dissolved in 10 cc. of boiling alcohol, then 0.5 cc. of triethanolamine is added and the whole is maintained boiling for about 30 minutes. From the deep red solution, the intermediate dye of the probable formula

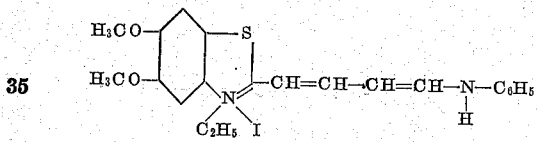

precipitates in the form of blue-red crystals. From alcohol the dye crystallizes as a red-brown crystalline powder. Its alcoholic solution has an indefinite absorption maximum at about 525μμ. The intermediate product has a medium sensitization intensity. Its maximum of sensitization is 560μμ and its range of sensitization is about 510 to 600μμ.

1 gram of the intermediate product thus obtained and 2 grams of 2:4-dimethylthiazole ethiodide are heated in 10 cc. of alcohol to boiling for about 10 minutes with the addition of 1 cc. of diethylamine. On cooling there separates from the deep blue reaction liquid [3-ethyl-5.6-dimethoxy-benzthiazole-(2)] - [3-ethyl-4-methyl-thiazole-(2)]-pentamethinecyanine methylthio-pentacarbocyanine iodide of the probable formula

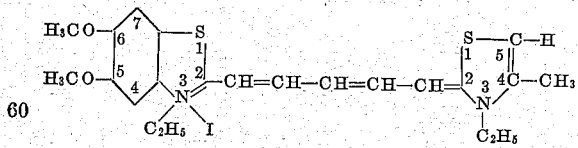

The alcoholic solution of the dye has an absorption maximum at a wave length of about 665μμ.

Incorporated in a silver bromide emulsion containing about 2 per cent of silver iodide the dye imparts to it a range of sensitivity from about 600μμ to 800μμ with a maximum of about 705μμ.

*Example 3.*—A mixture of 2 grams of 2-methyl-[naphto-2'.1':4.5-thiazole] ethiodide and 2 grams of α-phenylamido-γ-phenylimidopropene hydrochloride in 10 cc. of alcohol is heated to boiling for about ½ hour with 0.5 cc. of diethylamine. On cooling, there separates from the red-violet reaction mass the intermediate dye of the probable constitution:

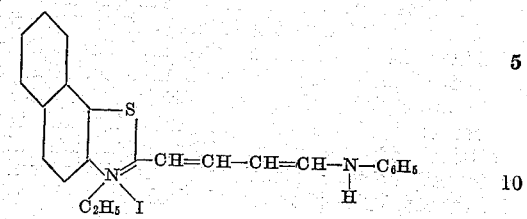

in the form of blackish-brown crystals.

The alcoholic solution of the dye has an absorption maximum at 540μμ.

1 gram of the dye obtained and 0.6 gram of 2-methylbenzthiazole ethiodide are dissolved in 10 cc. of hot alcohol and the solution is heated to boiling, whilst 0.5 cc. diethylamine is gradually added, until the reaction mixture becomes deep blue. By the addition of about 5 cc. of a solution of sodium perchlorate of 10 per cent strength, [3-ethyl-{naphto-2'.1':4.5-thiazole}-(2)] - [3-ethylbenzthiazole-(2)] - pentamethine-cyanine perchlorate of the probable formula:

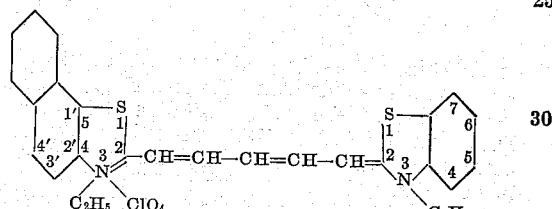

is precipitated. The dye crystallizes from alcohol as a blue-black crystalline powder.

The alcoholic solution of the dye has an absorption maximum at a wave length of about 680μμ.

Incorporated in a silver bromide emulsion containing about 4 per cent of silver iodide the dye imparts to it a range of sensitivity from about 700μμ to 800μμ with a maximum of about 713μμ.

*Example 4.*—For the production of [3-ethyl-benzselenazole-(2)] - [3-ethyl-4-methylthiazole - (2)]pentamethinecyanine iodide of the following formula:

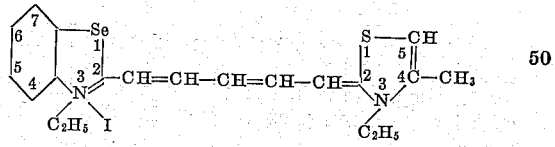

a mixture of 2 grams of 2-methylbenzselenazole ethiodide and 2 grams of α-phenylamido-γ-phenyl-imidopropene hydrochloride is first heated for half an hour in 10 cc. of alcohol with the addition of 1.5 cc. of triethanolamine. On cooling the intermediate product of the probable formula:

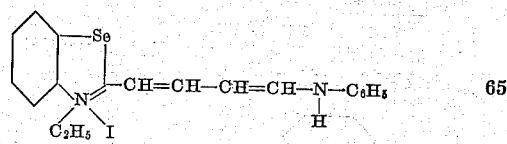

separates from the violet-red reaction liquid in the form of dark green crystalline tablets. The alcoholic solution of the product has an indefinite absorption maximum at about 525μμ. The product is a sensitizer for orange.

Incoporated in a silver bromide emulsion containing about 2 per cent of silver iodide the dye imparts to it a range of sensitivity from about 510μμ to 590μμ with a maximum at about 535μμ.

1 gram of the intermediate product and 2 grams of 2:4-dimethylthiazole ethiodide are dissolved in 10 cc. of alcohol and the solution is heated to boiling whilst about 3 cc. of an alcoholic solution of sodium ethylate (containing 3 per cent of sodium) are gradually added, until the mass becomes blue. The unsymmetrical pentamethinecyanine which is precipitated on cooling crystallizes from alcohol as a blue-black crystalline-powder.

The alcoholic solution of the dye has an absorption maximum at a wave length of about 660μμ.

Incorporated in a silver bromide emulsion containing about 2 per cent of silver iodide the dye imparts to it a range of sensitivity from about 570μμ to 780μμ with a maximum at about 680μμ.

*Example 5.*—The intermediate product of the probable formula:

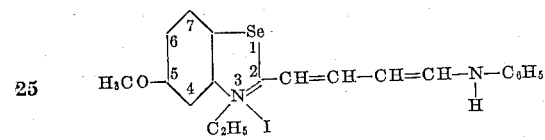

is obtained by using in Example 4 the 5-methoxy-2-methyl-benzselenazole ethiodide instead of 2-methyl-benzselenazole ethiodide. It crystallizes from alcohol in the form of a dark brown crystalline powder the alcoholic solution of which has an absorption maximum at 540μμ.

1 gram of the intermediate product so obtained is heated together with 0.6 gram of paratoluquinaldine ethiodide in 10 cc. of alcohol after the addition of 0.4 cc. of triethanolamine until the reaction mixture becomes dark green. [3-ethyl-5-methoxy-benzselenazole-(2)]-[1-ethyl-6-methyl-quinoline-(2)]-pentamethinecyanine iodide which separates on cooling and has probably the formula:

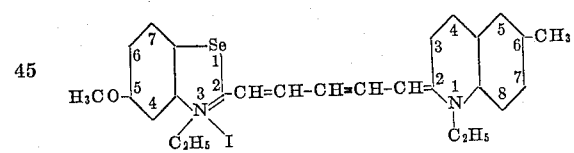

crystallizes from alcohol in small copper-colored deformed tablets.

The alcoholic solution of the dye has an absorption maximum at a wave length of about 690μμ.

Incorporated in a silver bromide emulsion containing about 2 per cent of silver iodide the dye imparts to it a range of sensitivity from about 610μμ to 810μμ with a maximum at about 730μμ.

*Example 6.*—2 grams of lepidine methiodide, 2 grams of α-phenylamido-γ-phenylimidopropene hydrochloride, 10 cc. of alcohol and 0.5 cc. of triethanolamine are heated to boiling for about 1 hour. On cooling, there separates from the red-violet solution the intermediate product of the probable formula:

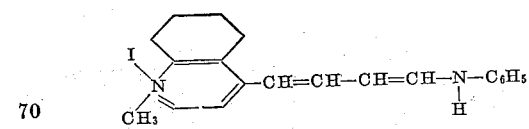

This product is a dye which crystallizes from alcohol in brown-black crystalline fragments. Its alcoholic solution has an absorption maximum at about 580μμ.

1 gram of this intermediate product and 1 gram of 2-methylbenzthiazole ethiodide are heated in 5 cc. of alcohol together with about 0.5 cc. of diethylamine until the reaction mass becomes dark green. On cooling the [1-methyl-quinoline-(4)]-[3-ethyl-benzthiazole-(2)]-pentamethinecyanine iodide separates. The dye has probably the formula:

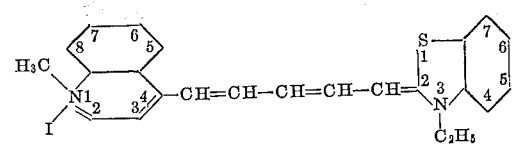

It crystallizes from alcohol in bronze colored deformed crystals.

Incorporated in a silver bromide emulsion containing about 2 per cent of silver iodide the dye imparts to it a range of sensitivity from about 600 to 850μμ with a maximum at about 775μμ.

*Example 7.*—2 grams of para-toluquinaldine ethiodide and 2 grams of α-phenylamido-γ-phenylimidopropene hydrochloride in 10 cc. of alcohol are heated for about 3 hours at 100° C. while adding 0.5 cc. of triethanolamine. The reaction product which separates after cooling is recrystallized from alcohol. The intermediate product of the probable formula:

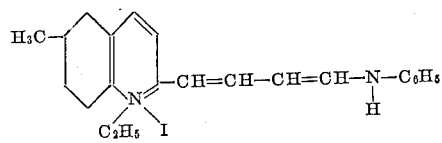

is thus obtained in form of red-brown crystalline little rods.

An alcoholic solution of the product has an indefinite absorption maximum at about 535μμ.

1 gram of the intermediate product is heated in 10 cc. of alcohol with 0.8 gram of 2-methyl-benzthiazole ethiodide with addition of about 0.5 cc. of diethylamine drop by drop, until the reaction mixture becomes blue-green. [1-ethyl-6-methyl-quinoline-(2)]-[3-ethyl-benzthiazole-(2)]-pentamethinecyanine iodide which separates on cooling and has probably the formula:

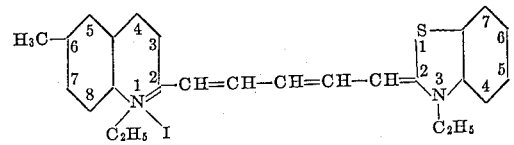

crystallizes from alcohol in brown-green deformed crystals.

The alcoholic solution of the dye has an absorption maximum at about 665μμ.

Incorporated in a silver bromide emulsion containing about 2 per cent of silver iodide the dye imparts to it a range of sensitivity from about 600μμ to 800μμ with a maximum at about 705μμ.

*Example 8.*—2 grams of 2-methylbenzthiazole ethiodide and 2 grams of α-phenylamido-γ-phenylimido-β-methylpropene hydrochloride (obtainable analogously to α-phenylamido-γ-phenylimidopropene hydrochloride from the correspondingly substituted propargyl aldehyde-acetal) are dissolved in 10 cc. of alcohol, and, after the addition of 0.4 cc. of piperidine, the solution is heated to boiling for about half an hour. On cooling there separates the intermediate product of the probable formula:

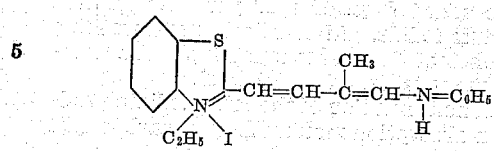

together with a small quantity of the symmetrical benzthiazole-pentamethinecyanine. By recrystallization from alcohol, there is obtained a red-brown, crystalline powder, whose alcoholic solution has an absorption maximum at about 513μμ.

For forming the [3-ethyl-benzthiazole-(2)]-[3-ethyl-{naphto-2'.1':4.5-thiazole}-(2)]-γ-methyl-pentamethinecyanine iodide, of the probable formula:

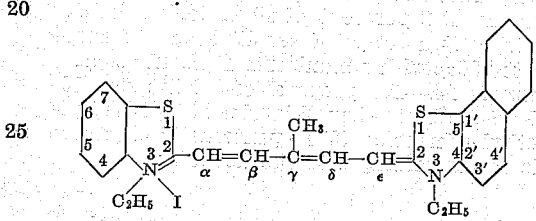

1 gram of the intermediate product prepared as above described and 1 gram of 2-methyl-[naphto-2'.1':4.5-thiazole]-ethiodide are heated at 130° C. in 10 cc. of pyridine for about half an hour until the reaction mixture becomes deep blue. On cooling the unsymmetrical pentamethinecyanine separates in the form of green crystals. It crystallizes from alcohol in the form of green rhomboids.

The alcoholic solution of the dye has an absorption maximum at about 665μμ.

Incorporated in a silver bromide emulsion containing about 4 per cent of silver iodide the dye imparts to it a range of sensitivity from about 590μμ to 800μμ with a maximum at about 710μμ.

Example 9.—For preparing [3-ethyl-benzthiazole-(2)]-[1-methyl-quinoline-(4)]-δ-methyl-pentamethinecyanine iodide of the probable formula

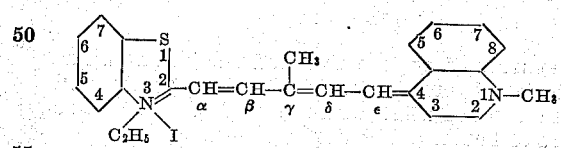

1 gram of the intermediate product described in Example 8 and 1 gram of lepidine methiodide are heated in 10 cc. of alcohol with the addition of about 1 cc. of diethylamine, until the reaction mixture assumes a permanent green color. The unsymmetrical pentamethinecyanine which separates on cooling is filtered by suction, washed with acetone and recrystallized from alcohol, whereby it is obtained in the form of a black-brown crystalline powder.

Incorporated in a sliver bromide emulsion containing about 2 per cent of silver iodide the dye imparts to it a range of sensitivity from about 600μμ to 850μμ, with a maximum at about 770μμ.

Example 10.—2 grams of 2-methylbenzselenazole ethiodide, 2 grams of α-phenylamido-γ-phenylimido-β-methylpropene hydrochloride, 10 cc. of alcohol and 0.5 cc. of diethylamine are heated in 10 cc. of alcohol to boiling for about half an hour. From the bluish-red reaction mixture the intermediate product of the probable formula:

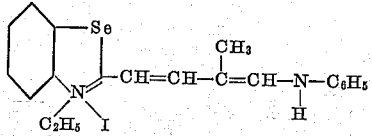

is precipitated by the addition of about 10 cc. of a solution of potassium iodide of 5 per cent strength. The dye crystallizes from alcohol in small red-violet rods. Its alcoholic solution has an indefinite absorption maximum at 530μμ.

1 gram of the intermediate product and 1 gram of 2-methyl-5:6-ethylenedioxy-benzselenazole ethiodide are heated together in 5 cc. of alcohol, with the addition of, about 1 cc. of diethylamine, until the reaction mixture assumes a permanent green color. Crystals of the [3-ethyl-benzselenazole-(2)]-[3-ethyl-5.6-ethylenedioxy-benzselenazole-(2)]-δ-methyl-pentamethinecyanine iodide which is formed and has probably the formula:

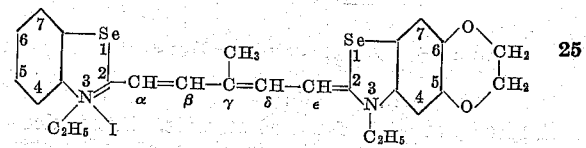

are deposited on the walls of the vessel. From alcohol, the dye crystallizes in green rhomboids.

The alcoholic solution of the dye has an absorption maximum at about 685μμ.

Incorporated in a silver bromide emulsion containing about 4 per cent of silver iodide the dye imparts to it a range of sensitivity from about 580μμ to 830μμ with a maximum at about 715μμ.

Example 11.—For preparing the dye [3-ethyl-6-ethoxy-benzthiazole-(2)]-[3-ethyl-{anthraceno-2'.1':4.5-thiazole}-(2)]-pentamethinecyanine iodide corresponding with the formula:

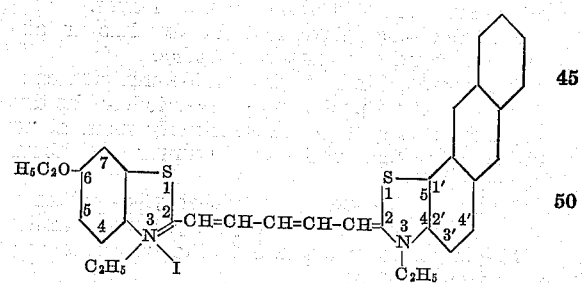

4 grams of 2-methyl-6-ethoxybenzthiazole ethiodide and 4 grams of α-phenylamido-γ-phenylimidopropene hydrochloride are heated in alcohol until dissolution occurs. Then there is added 1 cc. of piperidine while boiling the mixture and boiling is continued for about 1 hour. After cooling the dye separates in form of bluish red crystals.

The tetramethine dye is condensed with 2-methyl-[anthraceno-2'.1':4.5-thiazole] ethiodide in its alcoholic solution while boiling and in the presence of diethyl amine to the unsymmetrical pentamethinecyanine.

The alcoholic solution of the dye has an absorption maximum at a wave length of about 695μμ.

Incorporated in a silver bromide emulsion containing about 4 per cent of silver iodide the dye imparts to it a range of sensitivity from about 650μμ to 790μμ with a maximum at about 740μμ.

Example 12.—The dye [3-ethyl-5-diethylamino-benzthiazole-(2)]-[3-ethyl-{naphto-2'.1':4.5- thiazole}-(2)]-pentamethinecyanine perchlorate corresponding with the formula:

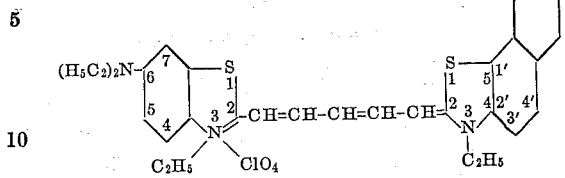

may be prepared by boiling 4 grams of 2-methyl-5-diethyl-aminobenzthiazole ethiodide with 3.5 grams of α-phenyl-amido-γ-phenylimidopropene hydrochloride in 20 cc. of alcohol and adding 1.6 grams of triethanolamine. The bluish red mixture is cooled and mixed with 10 cc. of a 10 per cent solution of sodium perchlorate, whereby the tetramethine dye corresponding probably with the formula:

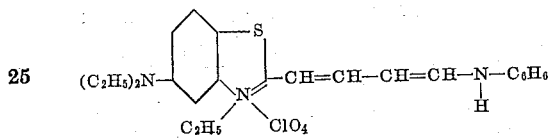

is precipitated in form of crystals. From alcohol the dye crystallizes in form of red-brown crystals.

The alcoholic solution of the compound has an absorption maximum at a wave length of about 540μμ.

1 gram of the intermediate product thus obtained is boiled with 0.6 gram of 2-methyl-[naphto-2'.1':4.5-thiazole diethylsulfate in 5 cc. of alcohol and there are slowly added about 0.3 cc. of diethylamine, whereby the mixture assumes a blue-violet color. On the addition of a few cc. of a 10 per cent solution of sodium perchlorate the dye is precipitated. The dye crystallizes from alcohol in form of brown-red small leaves.

The alcoholic solution of the dye has an absorption maximum at about 705μμ.

Incorporated in a silver bromide emulsion containing about 4 per cent of silver iodide the dye imparts to it a range of sensitivity from about 650μμ to 810μμ with a maximum at about 750μμ.

*Example 13.*—The dye [3-ethyl-5-methoxy-benzselenazole-(2)]-[3-ethyl-4-phenyl-thiazole-(2)]-pentamethinecyanine iodide corresponding with the formula:

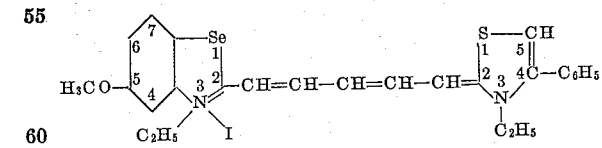

may be obtained by boiling 2 grams of 2-methyl-5-methoxy-benzselenazole ethiodide and 2 grams of α-phenylamido-γ-phenylimidopropene hydrochloride in 10 cc. of pyridine for about 3 minutes. From the reaction mixture which assumes a deep red color there is precipitated the intermediate product corresponding probably with the formula

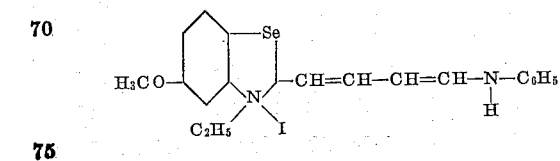

in form of red crystals. In order to complete the precipitation of the intermediate product there are added 5 cc. of a 10 per cent solution of potassium iodide. After filtering and washing with alcohol of 50 per cent strength the compound is recrystallized from alcohol.

The alcoholic solution of the intermediate product has an absorption maximum at a wave length of about 540μμ.

The intermediate product thus obtained and 0.8 gram of 2-methyl-4-phenylthiazole ethiodide are dissolved in 10 cc. of hot alcohol. The mixture is boiled while adding slowly 1 to 2 cc. of diethylamine until the mixture assumes a deep green color. After cooling the dye separates in form of green crystals.

The alcoholic solution of the dye has an absorption maximum at about 665μμ.

Incorporated in a silver bromide emulsion containing about 2 per cent of silver iodide the dye imparts to it a range of sensitivity from about 570μμ to 790μμ with a maximum at about 700μμ.

*Example 14.*—For preparation of the dye [3-ethyl-5.6-diethoxy-benzthiazole-(2)]-[3-ethyl-4-methyl-thiazole-(2)]-pentamethinecyanine iodide corresponding with the formula:

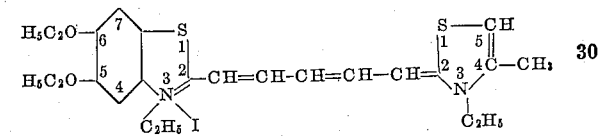

2 grams of 2-methyl-5.6-diethoxybenzthiazole ethiodide together with 2 grams of α-phenyl-amido-γ-phenylimidopropene hydrochloride are dissolved while warming, in 10 cc. of alcohol and then boiled for 2 hours with 1 cc. of an alcoholic solution of trimethylamine of 50 per cent strength. By adding about 20 cc. of a 5 per cent solution of potassium iodide, the intermediate product corresponding probably with the formula:

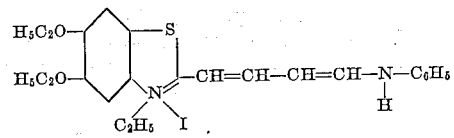

is separated from the dark-red reaction liquid as a dark-red tough oil which may be recrystallized from alcohol after washing with water in the form of bluish red leaflets.

The alcoholic solution of the compound has an absorption maximum at a wave length of about 535μμ.

1 gram of the intermediate product thus obtained is boiled with 1 gram of 2.4-dimethyl-thiazole ethiodide in 10 cc. of alcohol, and, after the addition of about 2 cc. of diethylamine, heated for 10 minutes in a steam bath. While the unsymmetric dye separates the color of the mixture changes into a bluish-violet. After cooling, the precipitate is filtered off, washed with acetone and recrystallized from alcohol in the form of green felted needles.

The alcoholic solution of the dye has an absorption maximum at about 675μμ.

Incorporated in a silver bromide emulsion containing about 2 per cent of silver iodide the dye imparts to it a range of sensitivity from about 600μμ to 800μμ with a maximum at about 710μμ.

*Example 15.*—In order to obtain [3-ethyl-5-methoxy-benzselenazole-(2)]-[1.6-dimethylquinoline-(4)]-pentamethinecyanine iodide corresponding with the formula:

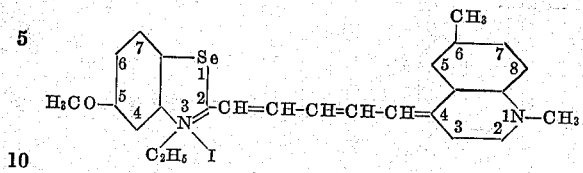

1 gram of the tetramethine dyestuff obtained according to Example 13 and corresponding with the formula:

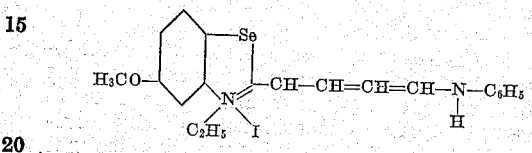

is dissolved, while warming, together with 1 gram of 4.6-dimethylquinoline methiodide in 10 cc. of alcohol and the mixture is maintained boiling for 5 minutes after adding about 1 cc. of diethylamine. On cooling, the dyestuff separates from the brownish green reaction liquid and crystallizes from alcohol in the form of brownish black rods.

Incorporated in a silver bromide emulsion containing about 4 per cent of silver iodide the dye imparts to it a range of sensitivity from about 650μμ to 880μμ with a maximum at about 770μμ.

Example 16.—[3-ethyl-6-ethoxy-benzthiazole-(2)]-[3-ethyl-3'-methyl-{naphto-1'.2':4.5 - thiazole}-(2)]-pentamethinecyanine iodide corresponding with the formula:

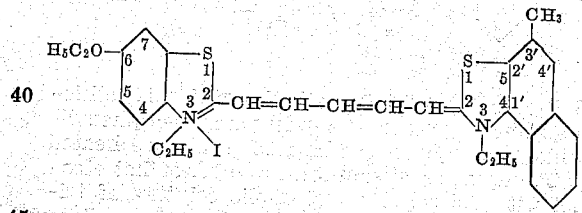

is obtained according to Example 11 by condensing the intermediate dyestuff with 2.6-dimethyl-4.5-benzobenzthiazole ethiodide. The dyestuff crystallizes from alcohol in the form of dark green leaflets.

The alcoholic solution of the dye has an absorption maximum at about 685μμ.

Incorporated in a silver bromide emulsion containing about 2 per cent of silver iodide the dye imparts to it a range of sensitivity from about 640μμ to 770μμ with a maximum at about 730μμ.

Example 17.—In order to obtain [1-methylquinoline-(4)]-[3.4-dimethyl-thiazole-(2)]-pentamethinecyanine iodide having the formula:

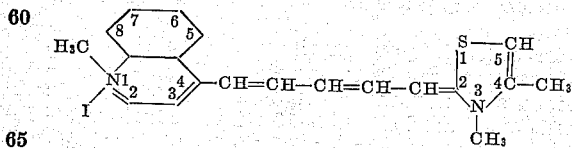

2 grams of lepidine methiodide and 2 grams of α-phenyl-amido-γ-phenylimidopropene hydrochloride are dissolved in 10 cc. of alcohol and boiled for 2 hours after adding 1 cc. of diethylamine. After cooling, the intermediate product crystallizes from alcohol.

The alcoholic solution of the dye has an absorption maximum at a wave length of about 580μμ.

0.7 gram of the tetramethine dyestuff thus obtained, probably corresponding with the formula:

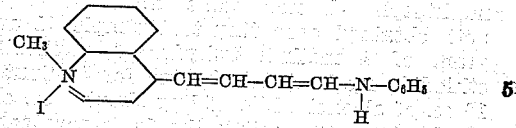

and 0.7 gram of 2.4-dimethylthiazole methiodide are heated to boiling in 10 cc. of alcohol, while adding about 1 cc. of diethylamine, until the mixture assumes a violet-blue color. The dyestuff which separates on cooling is sucked off and washed with acetone, until the acetone runs out in a pure blue coloration.

The dyestuff crystallizes from alcohol in the form of copper brown crystals.

Incorporated in a silver bromide emulsion containing about 2% of silver iodide the dye imparts to it a range of sensitivity from about 650μμ to 830μμ with a maximum at about 790μμ.

Example 18.—In order to prepare [1-ethyl-quinoline-(2)]-[3.4-dimethyl-5-carbethoxy-thiazole-(2)] - pentamethinecyanine iodide corresponding with the formula:

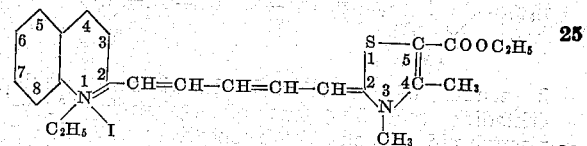

a mixture of 3 grams of quinaldine ethiodide and 3 grams of α-phenylamido-γ-phenylimidopropene hydrochloride is heated to weakly boiling for a short period in 10 cc. of pyridine. By adding 10 cc. of a 10 per cent solution of potassium iodide, the intermediate product is precipitated from the deep red solution in the form of red floccules. The tetramethine dyestuff having probably the formula:

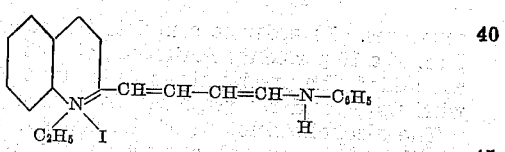

crystallizes from alcohol in the form of violet red rods.

1 gram of the intermediate product and 1 gram of 2.4-dimethyl-5-carboethoxythiazole methiodide are boiled in 10 cc. of alcohol, carefully mixed with about 1 cc. of diethylamine and kept boiling until the coloration changes to violet-blue. After cooling, the dyestuff separated, is sucked off, washed with acetone and recrystallized from alcohol.

The alcoholic solution of the dye has an absorption maximum at about 685μμ.

Incorporated in a silver bromide emulsion containing about 2% of silver iodide the dye imparts to it a range of sensitivity from about 570μμ to 820μμ with a maximum at about 730μμ.

Example 19.—In order to prepare [3-ethyl-6-ethoxy-benzthiazole-(2)]-[3-ethyl-{tetrahydronaphto-2'.1':4.5-thiazole}-(2)]-pentamethinecyanine iodide corresponding with the formula:

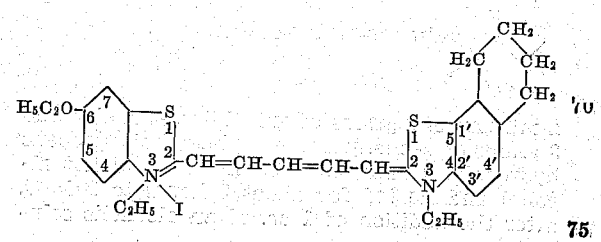

1 gram of 1-ethyl-6-ethoxybenzthiazole tetramethinephenylamido iodide (intermediate product) obtained according to Example 11 and 1 gram of 2-methyltetrahydro-β-naphthiazole ethiodide are heated to boiling for 5 minutes in 10 cc. of alcohol while adding about 1 cc. of diethylamine. On cooling, the dye separates from the deep blue reaction liquid and forms light green crystals.

It is purified by recrystallization from alcohol.

The alcoholic solution of the dye has an absorption maximum at about 670μμ.

Incorporated in a silver bromide emulsion containing about 4% of silver iodide the dye imparts to it a range of sensitivity from about 610μμ to 780μμ with a maximum at about 710μμ.

*Example 20.*—For the preparation of [3-ethyl-5-ethoxy-benzselenazole-(2)]-[3.4-dimethyl-thiazole-(2)]-pentamethinecyanine iodide corresponding with the formula:

[chemical structure]

2 grams of 2-methyl-5-ethoxybenzselenazole ethiodide and 2 grams of α-phenylamido-γ-phenylimidopropene hydrochloride are slowly boiled for about 3 minutes in 10 cc. of pyridine. On cooling, the intermediate product probably having the formula:

[chemical structure]

separates. In order to complete the separation, 5 cc. of a 10 per cent solution of potassium iodide are added, the precipitate is filtered off, washed with water and recrystallized from alcohol.

The alcoholic solution of the dye has an absorption maximum at a wave length of about 535μμ.

1 gram of the intermediate product thus obtained and 1 gram of 2.4-dimethylthiazole methiodide are boiled in 5 cc. of alcohol, while adding about 2 cc. of an alcoholic solution of triethylamine of 50 per cent strength.

The dyestuff crystallizes from alcohol in the form of fine green felted crystals.

The alcoholic solution of the dye has an absorption maximum at about 655μμ.

Incorporated in a silver bromide emulsion containing about 2% of silver iodide the dye imparts to it a range of sensitivity from about 550μμ to 790μμ with a maximum at about 690μμ.

*Example 21.*—In order to prepare [1-ethyl-quinoline-(2)]-[3-ethyl-6-acetylamino-benzthiazole-(2)]-pentamethinecyanine iodide corresponding with the formula:

[chemical structure]

a mixture of 3 grams of quinoldine ethiodide and 3 grams of α-phenylamide-γ-phenylimidopropene hydrochloride are dissolved in 10 cc. of hot alcohol and heated for about 3 hours to 100° C. after the addition of 1 cc. of an alcoholic solution of triethanolamine. On cooling, the tetramethine dye probably corresponding with the formula:

[chemical structure]

separates in the form of red violet crystals.

The alcoholic solution of the dye has an absorption maximum at a wave length of about 538μμ.

For the condensation of [1-ethyl-quinoline-(2)]-[3-ethyl-6-acetylamino-benzthiazole-(2)]-pentamethinecyanine iodide 1.2 grams of the above intermediate product and 1 gram of 2-methyl-6-acetylaminobenzthiazole diethyl sulfate are boiled with about 1 cc. of an alcoholic solution of triethanolamine until the dyestuff crystallizes out.

The alcoholic solution of the dye has an absorption maximum at about 695μμ.

Incorporated in a silver bromide emulsion containing about 4 per cent of silver iodide the dye imparts to it a range of sensitivity from about 610 to 800μμ with a maximum at about 730μμ.

*Example 22.*—In order to obtain [3-ethyl-5.6-dimethyl-benzthiazole-(2)]-[3-methyl-4-phenyl-thiazole-(2)]-δ-methyl-pentamethinecyanine iodide having the formula:

[chemical structure]

2 grams of 2.5.6-trimethylbenzthiazole ethiodide and 2 grams of α-phenylamido-γ-phenylimido-β-methylpropene hydrochloride are heated to boiling after dissolution in 10 cc. of hot alcohol with 0.5 cc. of an alcoholic solution of triethanolamine. After cooling the intermediate dyestuff probably having the formula:

[chemical structure]

separates as a brown-violet crystalline mass. The precipitate is filtered off, washed with cold alcohol and recrystallized from alcohol for the purpose of purification.

The alcoholic solution of the dye has an absorption maximum at a wave length of about 530μμ.

In order to prepare the unsymmetrical dye, 0.8 gram of the intermediate product thus obtained and 1 gram of 2-methyl-4-phenylthiazole methiodide are boiled for 10 minutes, while adding about 2 cc. of an alcoholic solution of diethylamine. The resulting dyestuff separates in greenish crystals already during heating.

The alcoholic solution of the dye has an absorption maximum at about 665μμ.

Incorporated in a silver bromide emulsion containing about 2 per cent of silver iodide the dye imparts to it a range of sensitivity from about 590μμ to 750μμ with a maximum at about 695μμ.

*Example 23.*—In order to prepare [3-ethyl-5.6-dimethyl-benzthiazole-(2)]-[1-ethyl-6-methylquinoline-(2)]-δ-methyl-pentamethinecyanine perchlorate corresponding with the formula:

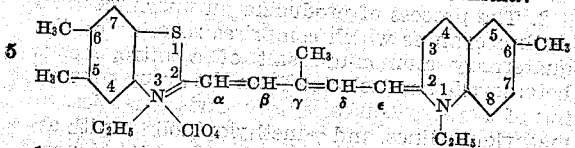

1 gram of p-toluquinaldine ethiodide and 1 gram of ε-phenylamido-5.6-dimethylbenzthio-γ-methyltetramethine ethiodide as obtained according to Example 22 are mixed with about 2 cc. of an alcoholic solution of diethylamine while boiling in 15 cc. of alcohol and kept boiling, until the green coloration remains. By adding 15 cc. of 10 per cent solution of sodium perchlorate, the unsymmetrical pentamethinecyanine is precipitated in blue floccules. A bluish black crystalline powder crystallizes from alcohol.

The alcoholic solution of the dye has an absorption maximum at about 670 $\mu\mu$.

Incorporated in a silver bromide emulsion containing about 4 per cent of silver iodide the dye imparts to it a range of sensitivity from about 600 $\mu\mu$ to 800 $\mu\mu$ with a maximum at about 720 $\mu\mu$.

*Example 24.*—In order to prepare [3-ethyl-5-ethoxy-benzselenazole-(2)]-[3.4-methyl-thiazole-(2)]-δ-methyl-pentamethinecyanine iodide corresponding with the formula:

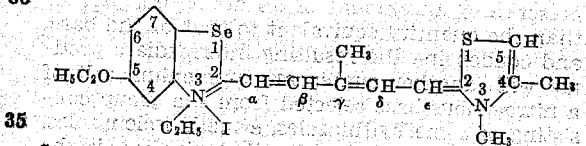

2 grams of 2-methyl-5-ethoxybenzselenoazole ethiodide and 2 grams of α-phenylamido-γ-phenylimido-β-methyl-propene hydrochloride are slowly boiled for a short period with 10 cc. of pyridine. In order to complete the separation of the intermediate dyestuff probably having the formula:

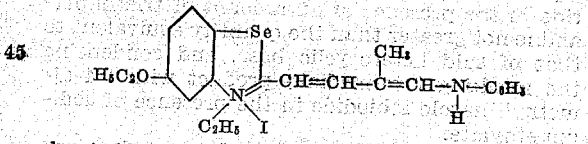

about 10 cc. of a 10 per cent solution of potassium iodide are added to the red reaction liquid, then the mixture is filtered and the residue washed with water. Greyish red leaflets crystallize from alcohol.

The alcoholic solution of the dye has an absorption maximum at a wave length of about 530 $\mu\mu$.

1 gram of this tetramethine dye and 1 gram of 2.4-dimethylthiazole methiodide are boiled in 10 cc. of alcohol, while adding 1 to 2 cc. of diethylamine, until a deep blue-violet coloration occurs. The dyestuff crystallizes from alcohol in the form of a bluish black crystalline powder.

*Example 25.*—In order to prepare [3-ethyl-{naphto-2'.1':4.5-thiazole}-(2)]-[3-ethyl-4-methyl-5-carbethoxy-thiazole-(2)]-pentamethinecyanine iodide having the formula:

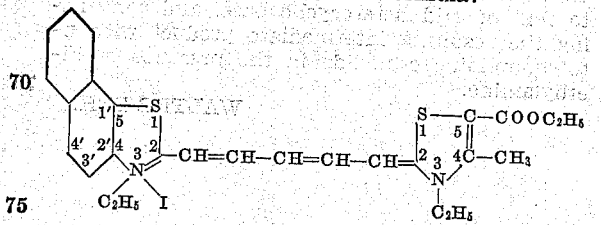

1 gram of 2.4-dimethyl-5-carbethoxythiazole ethiodide and 1 gram of ε-phenylamido-6.7-benzobenzthiazotetramethine ethiodide as obtained according to Example 3 are heated in 15 cc. of alcohol while adding about 3 cc. of an alcoholic solution of trimethylamine of 50 per cent strength until the dyestuff separates in the form of bronze crystals.

The alcoholic solution of the dye has an absorption maximum at about 675 $\mu\mu$.

Incorporated in a silver bromide emulsion containing about 2 per cent of silver iodide the dye imparts to it a range of sensitivity from about 650 $\mu\mu$ to 780 $\mu\mu$ with a maximum at about 730 $\mu\mu$.

*Example 26.*—In order to obtain [3-ethyl-5-ethoxy-benzselenazole-(2)]-[3-ethyl-5-chloro-6-methylbenzthiazole-(2)]-pentamethinecyanine iodide

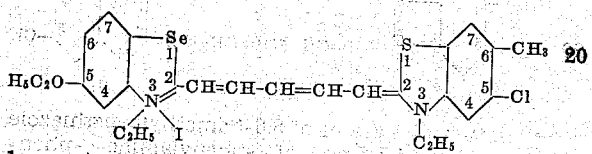

1 gram of 1-ethyl-5-ethoxybenzselenotetramine iodide as obtained according to Example 20 and 1 gram of 2.6-dimethyl-5-chlorobenzthiazole ethiodide are boiled in 10 cc. of alcohol, then mixed with 2.5 cc. of a solution of sodium ethylate containing 3 per cent of sodium and heated until the resulting dye separates from the brownish green reaction liquid. The dye crystallizes in the form of blackish-green tablets from alcohol.

The alcoholic solution of the dye has an absorption maximum at about 675 $\mu\mu$.

Incorporated in a silver bromide emulsion containing about 4 per cent of silver iodide the dye imparts to it a range of sensitivity from about 610 $\mu\mu$ to 780 $\mu\mu$ with a maximum at about 720 $\mu\mu$.

*Example 27.*—In order to prepare [3-ethyl-6-methyl-benzthiazole-(2)]-[3-ethyl-{acenaphtheno-5'.4':4.5-thiazole}-(2)]-pentamethinecyanine iodide corresponding with the formula:

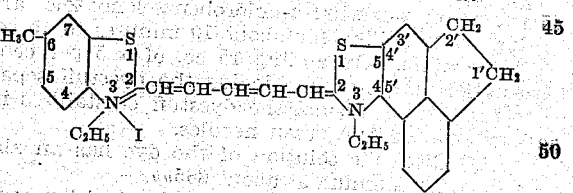

2 grams of 2-methyl-p-tolylthiazole ethiodide and 2 grams of α-phenylamido-γ-phenylimido-propene hydrochloride are dissolved in about 10 cc. of hot alcohol and heated to boiling for about 2 hours after adding 0.6 gram of piperidine. The intermediate product which separates on cooling and probably corresponds with the formula:

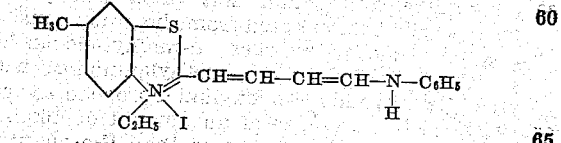

is recrystallized from alcohol in order to free it from symmetrical pentamethinecyanine formed simultaneously.

The alcoholic solution of the dyestuff has an absorption maximum at a wave length of about 515 $\mu\mu$.

In order to produce [3-ethyl-6-methyl-benzthiazole-(2)]-3-ethyl-{acenaphtheno-5'.4':4.5-thiazole}-(2)]-pentamethinecyanine iodide, 0.5 gram of the tetramethine dyestuff and 0.5 gram of 2-methylacenaphthenethiazole ethiodide are boiled in 10 cc. of alcohol together with 0.5 cc. of piperidine. The unsymmetrical dyestuff which separates out in the form of green crystals crystallizes from alcohol in the form of hair-fine green needles.

The alcoholic solution of the dye has an absorption maximum at about 675μμ.

Incorporated in a silver bromide emulsion containing about 4 per cent of silver iodide the dye imparts to it a range of sensitivity from about 600μμ to 790μμ with a maximum at about 715μμ.

*Example 28.*—For the preparation of [3-ethyl-5.6-dimethyl-benzthiazole-(2)]-[3-ethyl-5-chloro-benzselenazole-(2)]-pentamethinecyanine iodide corresponding with the formula:

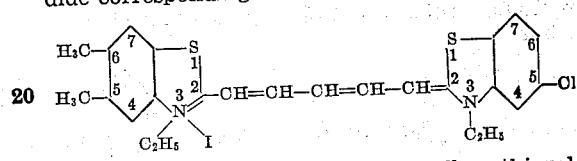

a mixture of 4 grams of 5.6-trimethylbenzthiazole ethiodide and 5 grams of α-phenylamido-γ-phenylimidopropene hydrochloride are heated to boiling with 1 cc. of piperidine for about 2 hours in 20 cc. of alcohol. The intermediate product which separates on cooling and probably has the formula:

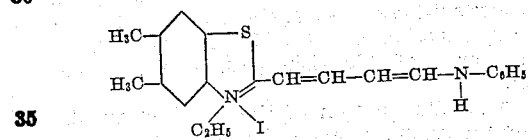

is recrystallized from alcohol and forms carmine red little rods.

The alcoholic solution of the dye has an absorption maximum at a wave length of about 525μμ.

In order to obtain 1.1'-diethyl-5.6-dimethylbenzthio-6'-chlorobenzselenopentacarbocyanine iodide 1 gram of the tetramethine dye and 1 gram of 2-methyl-5-chlorobenzselenoazole are heated to boiling for about 10 minutes in 15 cc. of pyridine. On adding 15 cc. of a 5 per cent solution of potassium iodide the dyestuff separates. From alcohol the dyestuff crystallizes in the form of fine green needles.

The alcoholic solution of the dye has an absorption maximum at about 665μμ.

Incorporated in a silver bromide emulsion containing about 4 per cent of silver iodide the dye imparts to it a range of sensitivity from about 600μμ to 770μμ with a maximum at about 705μμ.

What I claim is:

1. The process of producing an unsymmetrical methinecyanine which comprises reacting on the quaternary ammonium salt of a nitrogenous heterocyclic base selected from the group consisting of α-methylthiazoles, α-methylselenazoles, α-methylquinolines and γ-methylquinolines with an α-phenylamido-γ-phenylimidopropene hydrohalide in the presence of an amount of alkaline condensing agent not greater than the quantity equivalent to that of the base, and condensing the resulting intermediate product with another quaternary ammonium salt of a nitrogenous base selected from the group consisting of α-methylthiazoles, α-methylselenazoles, α-methylquinolines, and γ-methylquinolines in the presence of an alkaline condensing agent.

2. The process of producing an unsymmetrical methinecyanine which comprises reacting on the quaternary ammonium salt of a nitrogenous heterocyclic base selected from the group consisting of α-methylthiazoles, α-methylselenazoles, α-methylquinolines, and γ-methylquinolines with an amount of an α-phenylamido-γ-phenylimidopropene hydrohalide substantially surpassing the quantity equivalent to that of the base in the presence of an amount of alkaline condensing agent not greater than the quantity equivalent to that of the base, and condensing the resulting intermediate product with another quaternary ammonium salt of a nitrogenous base selected from the group consisting of α-methylthiazoles, α-methylselenazoles, α-methylquinolines, and γ-methylquinolines in the presence of an alkaline condensing agent.

3. The process of producing an unsymmetrical methincyanine which comprises reacting on the quaternary ammonium salt of a nitrogenous heterocyclic base selected from the group consisting of α-methylthiazoles, α-methylselenazoles, α-methylquinolines, and γ-methylquinolines with an amount of an α-phenylamido-γ-phenylimidopropene hydrohalide substantially surpassing the quantity equivalent to that of the base in the presence of an amount of an amine not greater than the quantity equivalent to that of the base, and condensing the resulting intermediate product with another quaternary ammonium salt of a nitrogenous base selected from the group consisting of α-methylthiazoles, α-methylselenazoles, α-methylquinolines and γ-methylquinolines in the presence of an amine.

4. The process of producing [3-ethyl-benzselenazole-(2)]-[3-ethyl-4-methyl-thiazole-(2)]-pentamethinecyanine iodide, which comprises reacting on 2-methyl-benzselenazole ethiodide with α-phenylamido-γ-phenylimidopropene hydrochloride in the presence of an amount of triethanolamine not greater than the quantity equivalent to that of said heterocyclic base, and condensing the resulting intermediate product with 2.4-dimethylthiazole ethiodide in the presence of sodium ethylate.

5. The process of producing [1-methyl-quinoline-(4)]-[3-ethyl-benzthiazole-(2)]-pentamethinecyanine iodide, which comprises reacting on lepidine methiodide with α-phenylamido-γ-phenylimidopropene hydrochloride in the presence of an amount of triethanolamine not greater than the quantity equivalent to that of said heterocyclic base, and condensing the resulting intermediate product with 2-methylbenzthiazole ethiodide in the presence of diethylamine.

6. The process of producing [3-ethyl-5.6-dimethylbenzthiazole-(2)]-[1-ethyl-6-methylquinoline-(2)]-δ-methylpentamethinecyanine perchlorate, which comprises reacting on 2.5.6-trimethylbenzthiazole ethiodide with α-phenylamino-γ-phenylimido-β-methylpropene hydrochloride in the presence of an amount of triethanolamine not greater than the quantity equivalent to that of said heterocyclic base, and condensing the resulting intermediate product with p-toluquinaldine ethiodide in the presence of diethylamine.

WALTER ZEH.